(12) United States Patent
Good et al.

(10) Patent No.: US 10,725,459 B2
(45) Date of Patent: Jul. 28, 2020

(54) IDENTIFYING AND DISTRIBUTING OPTIMAL MACHINE PARAMETERS WITHIN A FLEET OF ADDITIVE MANUFACTURING MACHINES

(71) Applicant: General Electric Company, Schenectady, NY (US)

(72) Inventors: Brandon Good, Niskayuna, NY (US); Jacob Berlier, Niskayuna, NY (US); Li Zhang, Niskayuna, NY (US); Adam McCann, Niskayuna, NY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 15/671,823

(22) Filed: Aug. 8, 2017

(65) Prior Publication Data

US 2019/0049929 A1 Feb. 14, 2019

(51) Int. Cl.
*G05B 19/418* (2006.01)
*B33Y 50/02* (2015.01)
(Continued)

(52) U.S. Cl.
CPC ........ *G05B 19/4185* (2013.01); *B23K 26/032* (2013.01); *B23K 26/342* (2015.10);
(Continued)

(58) Field of Classification Search
CPC ............................ G05B 19/4185; B33Y 50/02
See application file for complete search history.

(56) References Cited

U.S. PATENT DOCUMENTS

2008/0223832 A1 9/2008 Song et al.
2009/0091738 A1* 4/2009 Morcom ................. G01S 17/08
356/5.03
(Continued)

OTHER PUBLICATIONS

C. Liu, H. Wang, X. Fu and D. Xie, "Research on Quality Control under Small Batch Production Condition," 2010 International Conference on Measuring Technology and Mechatronics Automation, Changsha City, 2010, pp. 147-150.doi: 10.1109/ICMTMA .2010. 468 (Year: 2010).*

(Continued)

*Primary Examiner* — Nathan L Laughlin
(74) *Attorney, Agent, or Firm* — Dority & Manning, P.A.

(57) ABSTRACT

Method, and corresponding system, for iteratively distributing improved process parameters to a fleet of additive manufacturing machines. The method includes receiving sensor data from a sensor for a first machine of the fleet of machines. The method further includes comparing the sensor data values at the working tool positions of the plurality of layers to reference data values at the working tool positions for the plurality of layers to determine a set of comparison measures for the first machine. The method further includes selecting a machine from among the first machine and at least a second machine of the fleet of machines based at least in part on the comparison measures of each of the machines. The method further includes receiving, from the selected machine, process parameters of the selected machine; and transmitting at least part of the process parameters of the selected machine to other machines of the fleet.

19 Claims, 8 Drawing Sheets

(51) Int. Cl.
*B23K 26/03* (2006.01)
*B23K 26/342* (2014.01)
*B22F 3/105* (2006.01)

(52) U.S. Cl.
CPC .............. *B33Y 50/02* (2014.12); *B22F 3/1055* (2013.01); *B22F 2003/1057* (2013.01); *G05B 2219/35134* (2013.01); *G05B 2219/49007* (2013.01)

(56) References Cited

U.S. PATENT DOCUMENTS

| | | | |
|---|---|---|---|
| 2010/0082120 A1 | 4/2010 | Stephenson et al. | |
| 2013/0290223 A1* | 10/2013 | Chapelle | G06F 15/18 706/12 |
| 2015/0045928 A1* | 2/2015 | Perez | B29C 64/112 700/110 |
| 2015/0165683 A1 | 6/2015 | Cheverton et al. | |
| 2016/0185048 A1* | 6/2016 | Dave | B33Y 50/02 700/119 |
| 2016/0236419 A1 | 8/2016 | Griffin et al. | |
| 2016/0321384 A1 | 11/2016 | Pal et al. | |
| 2017/0129052 A1* | 5/2017 | Buller | B33Y 10/00 |

OTHER PUBLICATIONS

L. Song and J. Mazumder, "Feedback Control of Melt Pool Temperature During Laser Cladding Process," IEEE Transactions on Control Systems Technology, vol. 19, No. 6, pp. 1349-1356, Nov. 2011.doi: 10.1109/TCST.2010.2093901 (Year: 2011).*

Tapia G, Elwany A. A Review on Process Monitoring and Control in Metal-Based Additive Manufacturing. ASME, J. Manuf. Sci. Eng . 2014;136(6):060801-060801-10. doi:10.1115/1.4028540. (Year: 2014).*

W. Halsey, C. Steed, R. Dehoff, V. Paquit and S. Yoder, "Segmented time series visualization tool for additive manufacturing,"; 2016 IEEE 6th Symposium on Large Data Analysis and Visualization (LDAV), Baltimore, MD, 2016, pp. 97-98.doi: 10.1109/LDAV . 2016.7874336 (Year: 2016).*

Strano, "Multi-Objective Optimization in Additive Manufacturing", University of Exeter, https://ore.exeter.ac.uk/repository/handle/10871/8405, May 31, 2012, 289 pp.

Bourhis et al., "Predictive Model for Environmental Assessment in Additive Manufacturing Process", 21st CIRP Conference on Life Cycle Engineering, pp. 26-31, 2014, 26 pp.

Bikas et al., "Additive Manufacturing Methods and Modelling Approaches: A Critical Review", The International Journal of Advanced Manufacturing Technology, vol. 83, Issue 1, pp. 389-405, Mar. 2016, 17 pp.

Kerbrat et al., "Environmental Impact Assessment Studies in Additive Manufacturing", Nantes Institute of Communication and Cyber Research, Jun. 2, 2016, 31 pp.

* cited by examiner

IDENTIFYING AND DISTRIBUTING OPTIMAL MACHINE PARAMETERS WITHIN A FLEET OF ADDITIVE MANUFACTURING MACHINES

FIELD OF THE INVENTION

Exemplary embodiments described herein relate to iteratively selecting a machine and distributing improved process parameters from the selected machine to other machines in a fleet of additive manufacturing machines, the selected machine being chosen based on sensor data received from the machines.

BACKGROUND

The term "additive manufacturing" refers to processes used to synthesize three-dimensional objects in which successive layers of material are formed by an additive manufacturing machine under computer control to create an object using digital model data from a 3D model. One example of additive manufacturing is direct metal laser sintering (DMLS), which uses a laser fired into a bed of powdered metal, with the laser being aimed automatically at points in space defined by a 3D model, thereby melting the material together to create a solid structure. The term "direct metal laser melting" (DMLM) may more accurately reflect the nature of this process since it typically achieves a fully developed, homogenous melt pool and fully dense bulk upon solidification. The nature of the rapid, localized heating and cooling of the melted material enables near-forged material properties, after any necessary heat treatment is applied.

The DMLS process uses a 3D computer-aided design (CAD) model of the object to be manufactured, whereby a CAD model data file is created and sent to the fabrication facility. A technician may work with the 3D model to properly orient the geometry for part building and may add supporting structures to the design, as necessary. Once this "build file" has been completed, it is "sliced" into layers of the proper thickness for the particular DMLS fabrication machine and downloaded to the machine to allow the build to begin. The DMLS machine uses, e.g., a 200 W Yb-fiber optic laser. Inside the build chamber area, there is a material dispensing platform and a build platform along with a recoater blade used to move new powder over the build platform. The metal powder is fused into a solid part by melting it locally using the focused laser beam. In this manner, parts are built up additively layer by layer—typically using layers 20 micrometers thick. This process allows for highly complex geometries to be created directly from the 3D CAD data, automatically and without any tooling. DMLS produces parts with high accuracy and detail resolution, good surface quality, and excellent mechanical properties.

Defects, such as subsurface porosity, can occur in DMLM processes due to various machine, programming, environment, and process parameters. For example, deficiencies in machine calibration of mirror positions and laser focus can result in bulk-fill laser passes not intersecting edge-outline passes. Such deficiencies can result in unfused powder near the surface of the component, which may break through the surface to cause defects which cannot be healed by heat treatment finishing processes. Another subsurface effect of deficiencies in calibration and machine programming is excessive dwelling at the turnaround points in raster scanning. Such dwell can result in excessive laser time (i.e., laser focus time) on a given volume, which may result in "keyholing" and subsurface porosity. Laser and optics degradation, filtration, and other typical laser welding effects can also significantly impact process quality, particularly when operating for dozens or hundreds of hours per build. Furthermore, the DMLM process has thermal shrink and distortion effects which may require CAD model corrections to bring part dimensions within tolerance.

To reduce such defects, process models could be used to predict local geometric thermal cycles during the DMLM process, thereby predicting material structure (e.g., grain) and material properties. Models could also be used to predict shrink and distortion, which would enable virtual iteration prior to the actual DMLM process. Furthermore, predictive models could be used to generate a compensated DMLM model to drive the additive manufacturing machine while accounting for such shrinkage and distortion.

Conventional models relating build parameters to expected melt pool characteristics can be incomplete and/or inaccurate because of shortcomings in the collection and use of data from sensors monitoring the manufacturing process. Many of these shortcomings arise because conventional manufacturing sensor configurations produce "context-less" data, i.e., data which does not have a frame of reference other than time of measurement. Consequently, captured manufacturing sensor data is not in a useful context for design teams to analyze. Another shortcoming of conventional manufacturing sensor configurations is that the sensors monitoring a DMLM process may produce unmanageable quantities of data. For example, a pyrometer monitoring a build may have a data acquisition rate of 50 kHz, which means that a tremendous quantity of data is produced over a build, which can last, e.g., from about a few hours to about 30 days or more. The size of the data file may increase during the build at a rate of about 2 GB per hour or more.

SUMMARY

Disclosed embodiments provide context-aware data which can lead to meaningful analytics of manufacturing processes which, in turn, can provide insights into design changes to improve such processes. Disclosed embodiments contextualize sensor data by linking it to manufacturing data during the build process. This contextual linkage informs the development and refinement of "digital twin" models and analytics to provide insights back to design and engineering to complete the physical-digital feedback loop. Manufacturing and sensor data which are "contextualized" in this manner result in higher fidelity digital twin models for parts.

Disclosed embodiments allow for consistent build quality and anomaly detection in DMLM printing through control and diagnostics of melt pool characteristics. Data may be tagged by geometry so that melt pool characteristics can be viewed and queried according to layer and scanning pattern. A "part genealogy" may be provided so that environmental conditions and process information are captured when depositing an individual layer. The knowledge of experienced operators, who may engage in "rounding" by sense of look, listen, and smell, may be effectively captured and digitized. Support may be provided for "debugging" tools to analyze production failures in real-time. A benchmark standard may be provided to allow part-to-part, build-to-build, and machine-to-machine comparison so that build and design tools are no longer in separate "silos." In-process analysis tools may be provided to avoid relying solely on post-build tools.

Disclosed embodiments enable design of experiment (DoE) based on contextualized data to improve product quality (e.g., part life, finish, etc.) and reproducibility. Insights may be developed regarding how parts are built to inform future design and modeling processes for computer-aided design and manufacturing (CAD/CAM). Such informed process changes help to optimize production effectiveness and reduce cost. Also, key machine performance characteristics may be captured to achieve individualized CAM.

The quality of the produced parts may be determined during manufacture by processing data received from sensors and image data. In addition, the quality of the produced parts may be determined by a post-production analysis of the parts. The condition of the manufacturing machine, as well as the environmental conditions, initial settings, and process data of the machine, may be evaluated based on the quality of the produced parts. Dimensional tolerances may be used to evaluate part quality because production failures often affect the dimensions of the part, e.g., failure modes relating to shrinking due to heat, and failure modes relating to deformation after the part is sliced from the build plate due to residual heat-related stresses.

In disclosed embodiments, process data for the manufacturing machines may be used to create a set of reference data. Measured sensor data for the machines may be mapped onto the reference and/or a 3D model of the part being manufactured to allow differences between the measured data and reference data to be analyzed. In disclosed embodiments, the characteristics of parts manufactured on different machines in the fleet may be compared to assess whether the manufacturing process for individual machines is varying or drifting over time. Image data from imaging equipment at each machine may be compared to the process data to determine whether the path of the working tool, e.g., a laser, is within dimensional tolerances.

In disclosed embodiments, measured sensor data, such as data from a pyrometer directed at the melt pool of the additive machine, may be compared to process data of the machine to ascertain whether changes in melt pool temperature accurately track the waveforms (e.g., square wave) defined by the process data. A cross-correlation, or other operation, may be performed to quantify the accuracy of the pyrometry characteristics. Differences between measured data and reference data may be evaluated based on whether the data sets are statistically different to a particular confidence level. A probabilistic function may be applied to the reference data to account for noise and other factors. The use of probabilistic functions, in effect, defines a specific tolerance for evaluating the data measured during the manufacturing process at each machine of the fleet. The quantitative evaluation of the measured sensor data and/or image data obtained during manufacture of the part may be correlated with input parameters of the manufacturing process, such as, for example, temperature, humidity, material type, the geometry of the part, the feed speed, etc., so that the effect of each of these parameters on the quality of the manufactured part can be quantified.

In one aspect, the disclosed embodiments provide a method, and corresponding system, for iteratively distributing process parameters from a selected machine to other machines in a fleet of additive manufacturing machines. The method includes receiving, at a first server, sensor data from a sensor for a first machine of the fleet of machines and determining, using a processor of the first server, values of the sensor data relative to time. The method further includes comparing the sensor data values at the working tool positions of the plurality of layers of a part being manufactured to reference data values at the working tool positions for the plurality of layers to determine a set of comparison measures for the first machine. The method further includes selecting a machine from among the first machine and at least a second machine of the fleet of machines based at least in part on the comparison measures of each of the machines and receiving via a network, from the selected machine, process parameters of the selected machine. The method further includes transmitting via a network at least part of the process parameters of the selected machine to other machines of the fleet.

In disclosed embodiments, the method may include one or more of the following features.

The method may include determining, using the processor of the first server, the working tool positions relative to time based on process data which controls operation of the first machine, the process data comprising vectors defining the working tool positions of each of the plurality of layers of the part being manufactured. The method may further include determining the sensor data values at the working tool positions of each of the plurality of layers based on a correlation of the values of the sensor data relative to time and the working tool positions of each of the plurality of layers relative to time.

The selecting of the machine, the receiving of the process parameters, and the transmitting of the process parameters may be iteratively repeated to reach a defined goal for the sets of comparison measures of the first machine and said at least second machine. Before the comparing, a probabilistic function may be applied to the reference data values at the working tool positions of the plurality of layers. The reference data values at the working tool positions of the plurality of layers may be determined based on a correlation of values of sensor data relative to time measured for a reference part and working tool positions of the plurality of layers of the reference part relative to time. The working tool positions of the plurality of layers of the reference part relative to time may be determined based on process data comprising vectors defining the working tool positions of each of the plurality of layers of the reference part during a manufacturing process of the reference part.

The method may include: receiving image data produced at the first manufacturing machine; correlating the image data to the working tool positions of the plurality of layers; and comparing the image data of the plurality of layers to reference image data for the plurality of layers to determine a second set of comparison measures for the first machine. The comparing of the image data of the plurality of layers to the reference image data may include determining deviation values between an actual laser path indicated by the image data and a target laser path defined by the reference image data. The reference image data of the plurality of layers may be determined by analysis of a reference part. The reference image data of the plurality of layers may be determined based on the vectors of the process data defining the working tool positions of each of the plurality of layers.

The process parameters may include at least one of: process data of the machine defining the working tool positions during manufacturing of the part, measurements of the operating environment of the machine, and operational settings of the machine. The comparing of the sensor data values to the reference data values may include performing a two-dimensional convolution between the sensor data values and the reference data values for each of the layers of the part to produce a comparison value for each of the layers, the comparison value of each of the layers becoming a member of the set of comparison measures of the first machine.

BRIEF DESCRIPTION OF THE DRAWINGS

Features and advantages of the exemplary embodiments, and the manner in which the same are accomplished, will become more readily apparent with reference to the following detailed description taken in conjunction with the accompanying drawings.

DETAILED DESCRIPTION

In disclosed embodiments, deep learning is implemented in a fleet of operating manufacturing machines to generate models and train the machines. The manufacturing machines of the fleet may be evaluated in terms of the quality of the produced output, e.g., 3D printed parts. A model developed by the best performing machine in the fleet may be spread to the other machines in the fleet to obtain improved fleet performance. The deployment of the best model to the other machines in the fleet may be done repeatedly in an iterative manner until defined performance goals are met.

Disclosed embodiments are directed to manufacturing machine fleet optimization. Sensor and image data received from each machine in a fleet of machines during manufacturing processes are collected and compared to a baseline, i.e., reference, set of data. The comparison of the received data to the reference data provides an indication of whether each of the machines is operating properly during the manufacture of a part. If a particular machine is having problems, such a condition can be detected and corrective action can be taken. In disclosed embodiments, the reference data may be obtained from a digital twin of the manufacturing machine. In disclosed embodiments, predictive models of manufacturing processes may be used to optimize large-scale jobs across multiple manufacturing machines.

Figure 1:
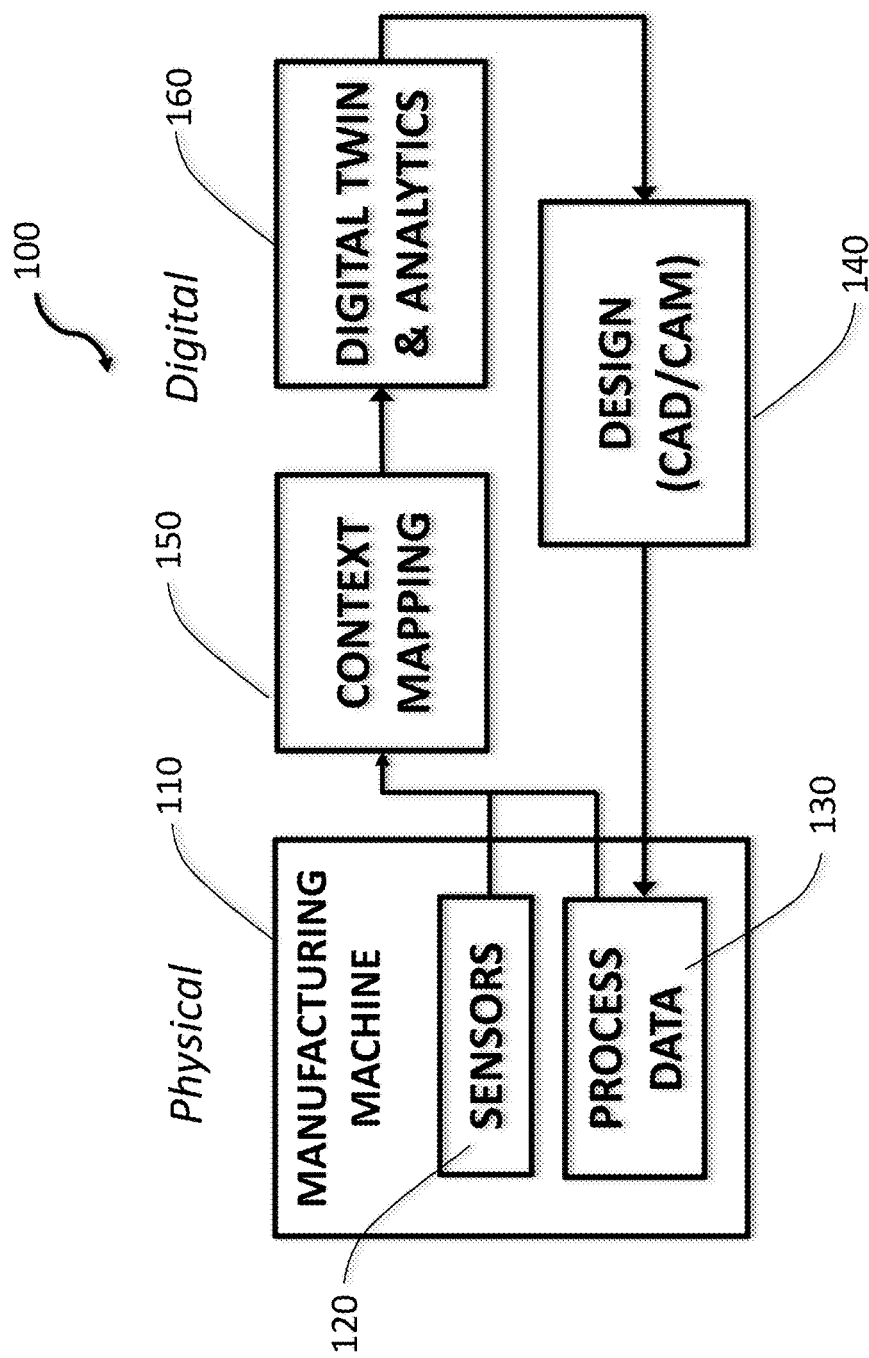
FIG. 1 is a block diagram of an embodiment of a system for receiving sensor data for an operating additive manufacturing machine and mapping the sensor data with process data which controls the operation of the machine.

FIG. 1 depicts a system 100 for receiving sensor data for an operating manufacturing machine 110 (e.g., sensor output which is sampled and digitized) and mapping the sensor data 120 with process data 130 which controls the operation of the manufacturing machine 110. The manufacturing machine 110 is computer controlled, e.g., by an internal processor having associated software which interacts with the various components of the machine 110. The software includes process data 130 which provides instructions for the machine 110 to fabricate a particular part. Such instructions may, for example, control the position, movement, and power setting of a laser in an additive manufacturing machine. The process data 130, in such a case, defines a path for the laser for each layer of a part. The process data 130 can be changed, as necessary, to modify the manufacturing process to refine the physical characteristics of a manufactured part or to produce a different part. In a typical case, the process data 130 is downloaded from a design facility 140, e.g., a computer-aided design and computer aided manufacturing (CAD/CAM) facility, and stored on the manufacturing machine 110.

The manufacturing machine 110 has a number of sensors 120 which monitor various aspects of the manufacturing process. These may include sensors 120 which measure the physical characteristics of a part being manufactured or worked on by the machine 110, such as, for example, temperature, pressure, acceleration, etc. It may also be desirable to have sensors 120 which are separately installed in or near the machine 110 to measure additional physical characteristics, e.g., a pyrometer to measure temperature during operation of an additive manufacturing machine. Typically, the sensors 120 continuously output data during the manufacturing cycle, e.g., build time, of a part. For purposes of discussion, the native sensors of the machine, as well as any separately installed sensors 120 which are monitoring the machine 110 (and/or the part being manufactured by the machine), are considered to result in "sensor data for the machine." In disclosed embodiments, the sensor data 120 may come directly from the machine 110 and also may come from separately installed sensors 120 (in which case the sensor output is sampled and digitized to produce the sensor data).

In disclosed embodiments, a context mapping 150 of the sensor data 120 is performed which correlates the sensor data 120 with the process data 130. In the resulting contextualized data, the various sensor 120 readings are associated with the instructions in the process data 130 based on a time reference, i.e., time correlation. Thus, for example, a sensor output measuring acceleration of the laser of an additive manufacturing machine can be aligned with specific directional and velocity instructions for the laser in the process data. This allows engineering and design teams to analyze data in the context of what was happening in the manufacturing process, rather than merely in the context of when the sensor measurement was taken. Therefore, for example, changes can be made to the laser instructions to change the laser path to reduce acceleration below a desired threshold.

In disclosed embodiments, the system 100 may be used to provide models in association with a machine learning framework, for example, a "digital twin" 160 of a twinned physical system (e.g., the manufacturing machine 110). A digital twin 160 may be a high fidelity, digital replica or dynamic model of an asset (e.g., an additive manufacturing machine) or process, used to continuously gather data and increase insights, thereby helping to manage industrial assets at scale. A digital twin 160 may leverage contextual data from the sensors 120 to represent near real-time status and operational conditions of an asset (e.g., the manufacturing machine 110) or process. A digital twin may estimate a remaining useful life of a twinned physical system using sensors, communications, modeling, history, and computation. It may provide an answer in a time frame that is useful, i.e., meaningfully prior to a projected occurrence of a failure event or suboptimal operation. It might comprise a code object with parameters and dimensions of its physical twin's parameters and dimensions that provide measured values, and keeps the values of those parameters and dimensions current by receiving and updating values via contextual data from the sensors associated with the physical twin. The digital twin may comprise a real time efficiency and life consumption state estimation device. It may comprise a specific, or "per asset," portfolio of system models and asset-specific sensors. It may receive inspection and/or operational data and track a single specific asset over its lifetime with observed data and calculated state changes. Some digital twin models may include a functional or mathematical form that is the same for like asset systems, but will have tracked parameters and state variables that are specific to each individual asset system. The sophisticated insights gained from analysis of contextual data and use of a digital twin 160 can be passed on to design and engineering elements 140 to allow for design changes to improve the part or the manufacturing process (e.g., the efficiency of the process).

Figure 2:
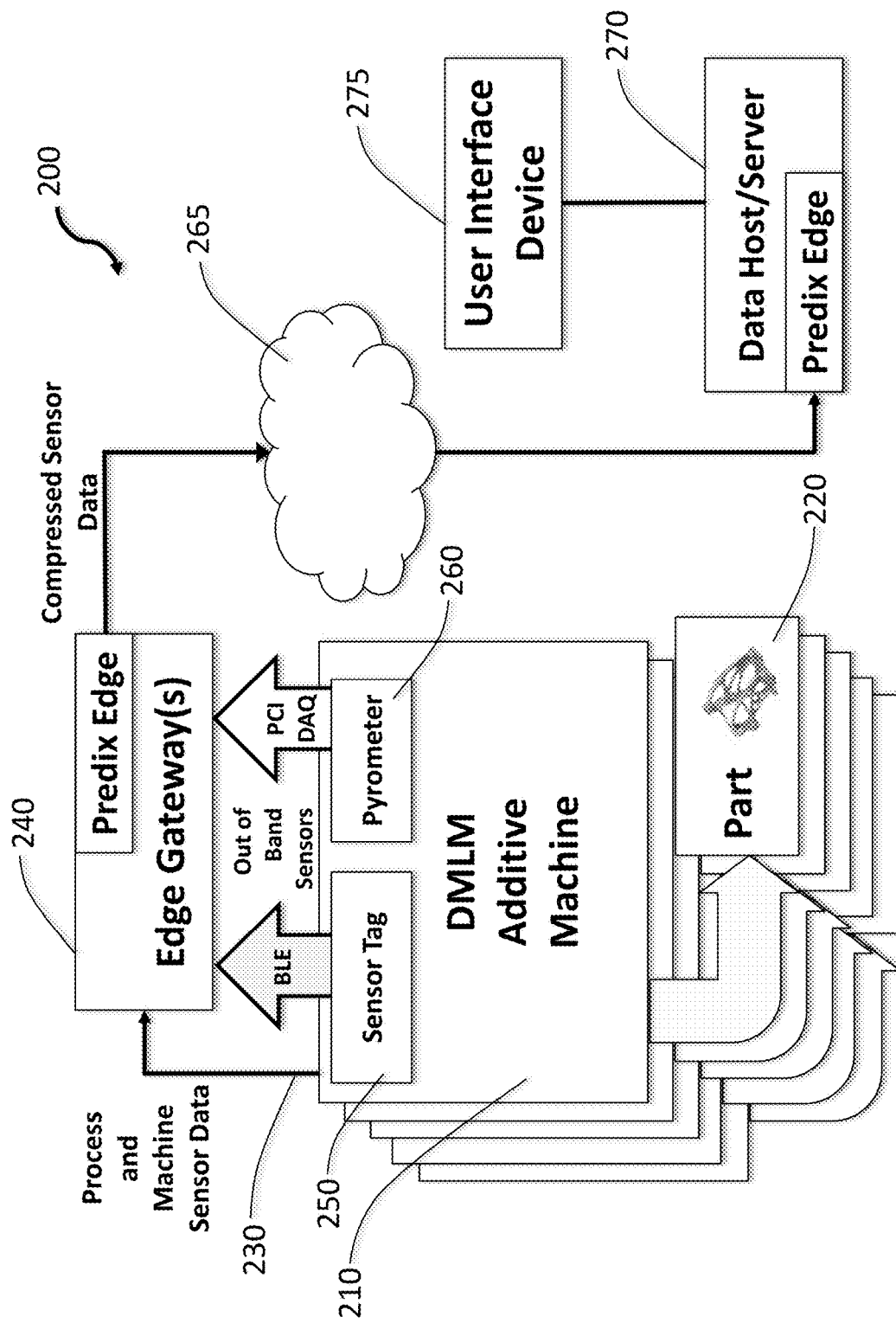
FIG. 2 is a block diagram of an embodiment of a system for receiving sensor data for an operating direct metal laser melting (DMLM) machine and mapping the sensor data with process data.

FIG. 2 depicts an embodiment of a system 200 for receiving sensor data for a fleet of direct metal laser melting (DMLM) additive manufacturing machines 210 (including sensor output from separately installed sensors, which is sampled and digitized) and mapping the sensor data with the process data. The operation of the machines 210 as they fabricate parts 220 is monitored by internal sensors of each machine, such as, for example, acceleration of the laser, humidity, ambient temperature, and "downbeam" images and video. The output of these sensors may be communicated through the control and monitoring channels 230 of each machine to one or more network computing and communication devices, such as, for example, edge gateway servers 240 (only one of which is depicted in FIG. 2). Additional sensors may be installed at each DMLM machine 210 to provide measurement data for parameters not measured by the native sensors of the machines 210. For example, a sensor tag 250 attached to and/or associated with the part being manufactured may provide data wirelessly, e.g., a tag which measures the presence of particular gasses. As a further example, a pyrometer 260 may be installed at each additive manufacturing machine 210 to measure surface temperatures on a part 220 being manufactured, which may serve as a measure of laser intensity. The output from these additional sensors may be transmitted via separate channels (i.e., "out of band") relative to the native sensors of the additive manufacturing machines, e.g., the sensor tag 250 data may be transmitted via a direct Bluetooth low energy (BLE) connection to the edge gateway(s) and the pyrometer 260 data may be transmitted from each machine via a direct peripheral component interconnect bus data acquisition (PCI DAQ).

As discussed in further detail below, the edge gateway 240 receives sensor output data from one or more additive manufacturing machines 210 and performs a context mapping (see, e.g., FIG. 1) with the process data which is used to control the one or more machines 210. The process data for each machine 210 may be sent to the edge gateway(s) 240 via a control and monitoring channel 230, i.e., the conventional data communication channel of the machine. Alternatively, the process data for a particular machine may be transmitted from another source, e.g., a design and engineering facility, in advance of the operation of the machine and stored in a memory of the corresponding edge gateway. In addition to the context mapping of the sensor output data, the edge gateway(s) 240 filter and/or compress the sensor data before transmitting it, thereby reducing the large amount of sensor data into a data set that can be practically transmitted via a network 265 (e.g., the internet or another cloud-based network).

The compressed, filtered data is received via the network 265 at a data host/server 270. Both the edge gateway(s) 240 and the data host/server 270 may communicate using Predix™ which has been developed by General Electric to provide cloud computing tools and techniques that provide application management and facilitate communication with industrial machines in distributed locations. In such a case, the edge gateway(s) 240 and one or more data host/servers 270 are each equipped with an implementation of Predix Edge, which enables these devices to communicate readily via the cloud-based network 265. The data host/server 270 performs various data storage and management functions. It is connected to a user interface device 275, such as, for example, a computer with a display and input devices. The user interface device 275 provides various ways of displaying and analyzing the data from the data host/server 270.

Figure 3:
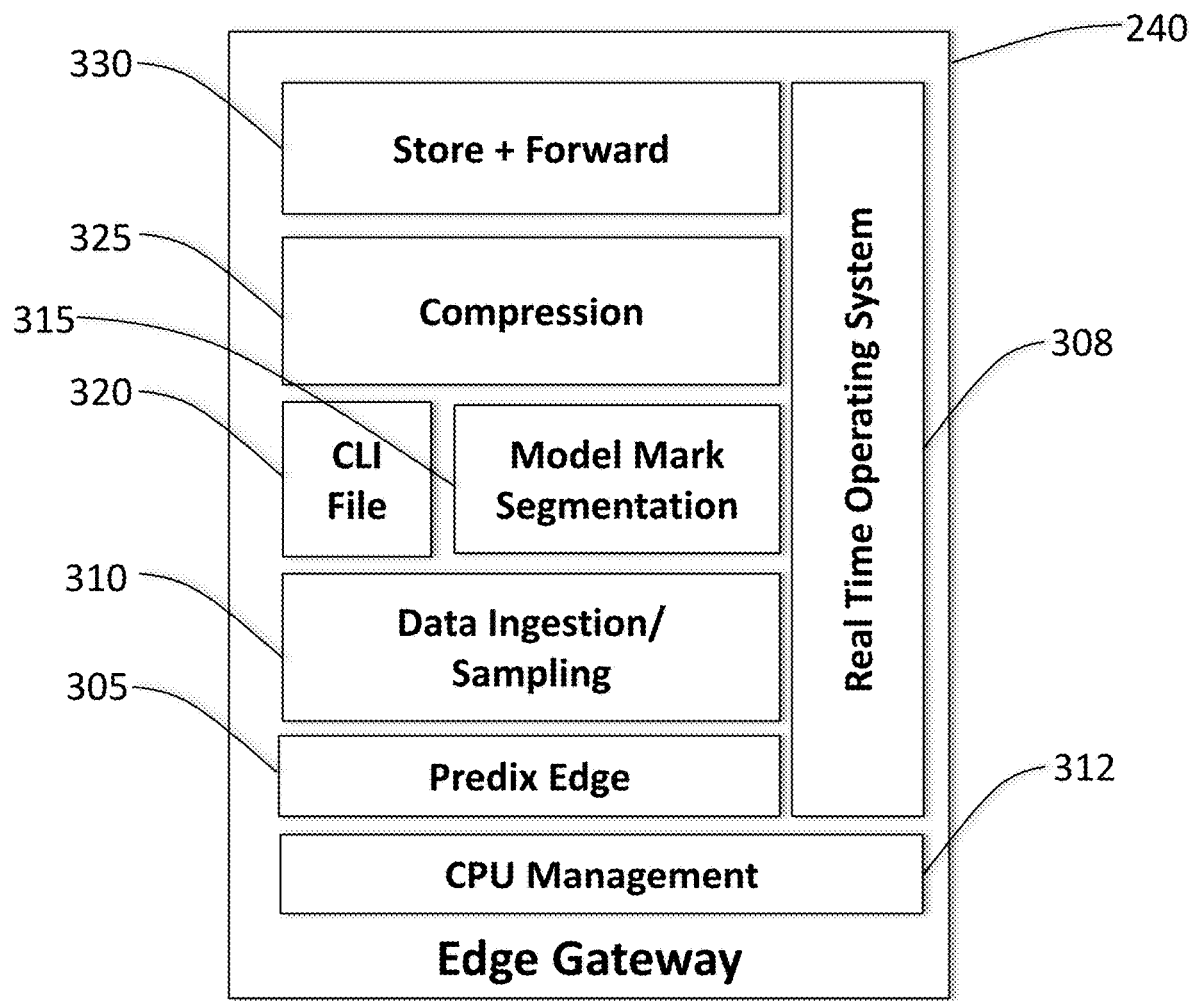
FIG. 3 is a block diagram of an embodiment of an edge gateway for receiving sensor data for a DMLM machine.

FIG. 3 depicts an embodiment of an edge gateway 240 for receiving sensor data for a DMLM machine 210 (see FIG. 2), including sensor output from separately installed sensors, which may be sampled and digitized. Each box represents an app (i.e., software application) which performs particular functions relating to the receiving and processing of sensor data. The boxes defined in this figure represent an embodiment of the edge gateway 240 in which the functions performed by the edge gateway 240 are divided among a specific combination of apps. Other embodiments of the edge gateway 240 may perform similar functions but may divide the functions among a different combination of apps (e.g., a combination in which the functions of two separate apps have been combined into a single app, or vice versa). The apps run on a conventional computer operating system, e.g., Microsoft Windows™ or Linux.

The edge gateway 240 receives data from native sensors of the additive manufacturing machine 210 via the network 230 communication channels which are used for control and monitoring of the machine (see FIG. 2). Such communications may be handled by an implementation of Predix Edge 305 in the edge gateway 240. In addition, there may be a data ingestion and sampling app 310 configured to receive out-of-band communications from additional sensors installed at the machine, such as, for example, a pyrometer. Prior to the data ingestion and sampling app 310, the receiving of the out-of-band communications may be handled by a real-time operating system (RTOS) 308 which is configured to handle the data as it is received in real time. In disclosed embodiments, an RTOS or a field programmable gate array (FPGA) is used to perform raw data acquisition operations in deterministic time before the apps (e.g., the data ingestion and sampling app 310) process the data. For example, some laser systems produce a digital trigger signal that is captured in sync with pyrometry data to provide microsecond accuracy the on/off times of the laser. The data ingestion and sampling app 310 may use specialized adapters to receive the out-of-band data and may provide signal conditioning, sampling at one or more specific rates (e.g., 50 kHz), and analog to digital conversion. The specialized adapters may include an adapter configured to receive Bluetooth low energy (BLE) signals from sensor tags. The edge gateway 240 also may include a central processing unit (CPU) management app 312 to control the use of multiple CPU cores to perform processing tasks more efficiently.

As noted above, the sensor data received from the pyrometer may be considered to be a measurement of laser intensity. To provide context for the intensity data, the edge gateway 240 maps the intensity data with the position of the laser obtained from process data, taking into account whether the laser is on or off at each position. To perform the mapping, the model mark segmentation app 315 maps the intensity data versus time. The process data relating to laser position and activation is stored in a common layer interface (CLI) file 320 in the form of laser scanning and movement (i.e., "jump") vectors arranged in layers—the laser being on during a scanning vector and off during a jump vector. The CLI file 320 is processed by the model mark segmentation app 315 to produce the position of the laser versus time while the laser is turned on for each layer of the part. The model mark segmentation app 315 correlates intensity and position of the laser to produce a data set for intensity versus position (while the laser is on). The mapped, i.e., correlated, data from the model mark segmentation app 315 is output to a compression app 325 to reduce data transmission requirements and is then sent to a store and forward app 330 where the data is stored in a buffer and forwarded for transmission via the network.

In disclosed embodiments, image and video data may use another measurement, e.g., pyrometry measurements, as a correlation reference, because light received by the imaging equipment will substantially coincide with the two-dimensional path of the activated laser on a particular layer. Alternatively, the process data, e.g., the CLI file, may be used to generate a two-dimensional correlation reference on a layer-by-layer basis. In either case, a two-dimensional correlation may be performed between an image or frame of video and the two-dimensional reference "image" produced by measurements or process data for a particular layer.

Figure 4:
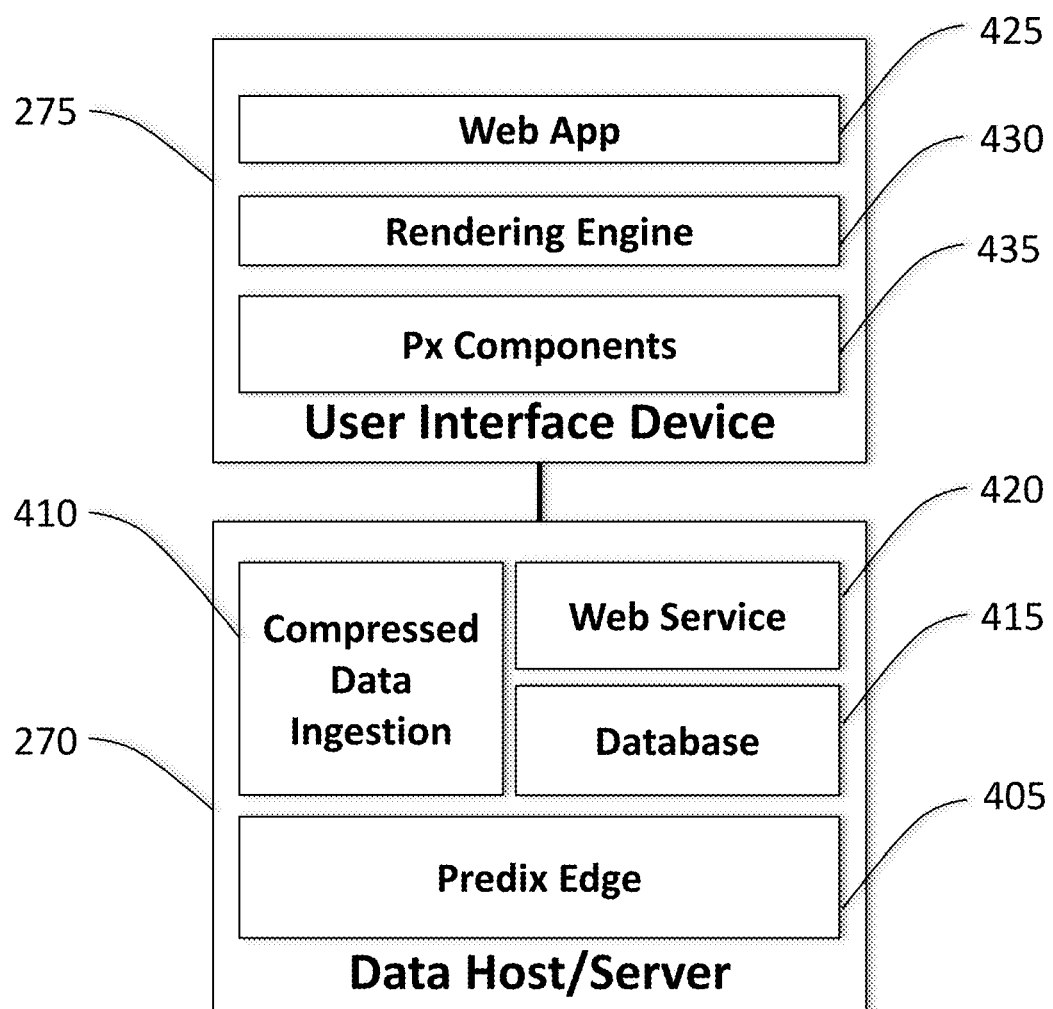
FIG. 4 is a block diagram of an embodiment of a data host/server and user interface device.

FIG. 4 depicts an embodiment of a data host/server 270 and user interface device 275 for receiving and analyzing sensor data from the edge gateway 240, which is connected to the DMLM machine 210 (see FIGS. 2 and 3). The sensor data may be, for example, laser intensity data based on pyrometer measurements. The data host/server 270 is connected via a network 265 to the edge gateway 240 (see FIG. 2) and may use Predix Edge 405 to facilitate communication and also to manage the apps running on the data host/server. The compressed laser intensity data transmitted by the edge gateway 240 (see FIG. 2) is received at the data host/server 270 by a compressed data ingestion app 410, where it is stored in a database 415. In disclosed embodiments, the ingested data is stored in correspondence with formation layers of the part being manufactured by the additive manufacturing machine. In such a case, the formation layers of the part may have an identifying number which allows data to be stored and retrieved based on a layer number. This allows a user to retrieve a set of laser intensity data for all (x, y) positions in a particular layer in its compressed form. The data is made available by the data host/server 270 via a web service 420 which is accessible by one or more user interface devices through a protocol such as, for example, representational state transfer (REST).

The user interface device 275 provides a web app 425 which accesses the web service 420 of the data host/server 270 to retrieve stored sensor data. The web app 425 may run as a standalone application on the native operating system of the user interface device 275 or it may be accessed via a browser running on the user interface device 275. Through the web app 425, the user may request data from the web service 420, e.g., data for a specific layer, in which case the relevant data is retrieved from the database 415 by the web service 420 and transmitted to the web app 425 on the user interface device 275. In disclosed embodiments, the data for the layer is decompressed by the user interface device 275, rather than by the data host/server 270. The decompression may be performed by the rendering engine 430 (discussed below) or a separate app/module running on the user interface device 275. This configuration allows the data to be sent from the data host/server 270 to a number of user interface devices 275 in compressed form, thereby reducing data communication requirements.

A rendering engine 430 is used to display the data in various formats, such as, for example, a three-dimensional perspective view. The rendering engine 430 may also color code the data so that the sensor data can be more easily visualized. For example, higher levels of laser intensity may be presented in red. The color coding may be applied by the rendering engine 430 to the surfaces of a 3D model of the manufactured part. The 3D model of the part may be stored, e.g., in a 3D CAD stereolithography (STL) file. The user interface device 275 may include Predix components 435 to facilitate the presentation of a graphical user interface.

Figure 5A:
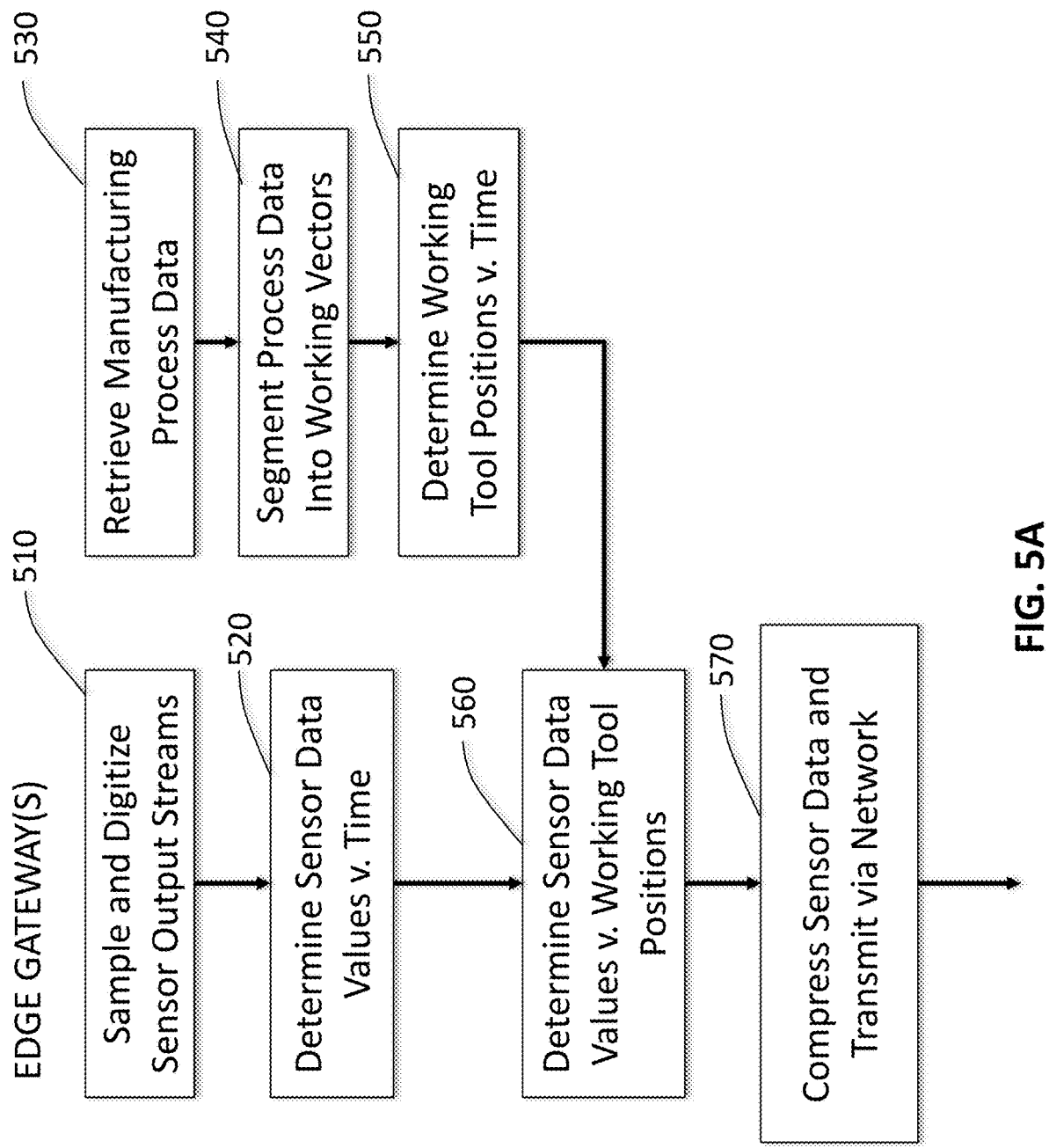
FIGS. 5A and 5B are a flowchart of an embodiment of a process for iteratively selecting a machine and distributing improved process parameters from the selected machine to other machines in a fleet of additive manufacturing machines.
Figure 5B:
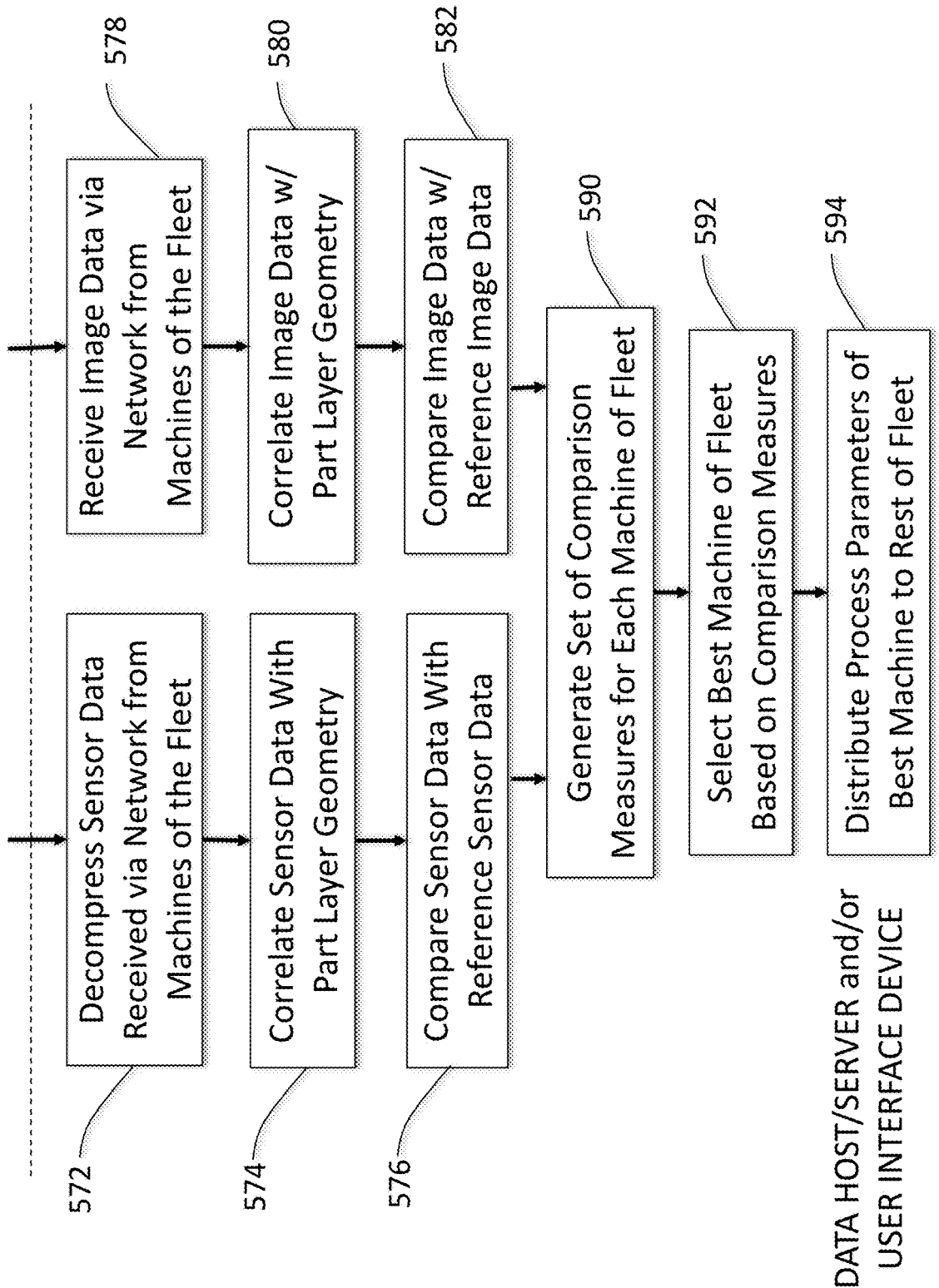

FIGS. 5A and 5B are a flowchart of an embodiment of a process for iteratively selecting a machine and distributing improved process parameters from the selected machine to other machines in a fleet of additive manufacturing machines. As shown in FIG. 5A, sensor output streams, e.g., from a pyrometer installed at each machine, are sampled at a determined frequency (e.g., 50 kHz) and digitized 510. This results in a stream of sensor data values at a known frequency for each machine. Therefore, each sensor data value can be associated with a specific time relative to a determined time reference 520.

Manufacturing process data for each machine is retrieved to obtain information regarding the path of the tool (e.g., a laser) during manufacture of the part 530 for a particular machine. The process data may be in the form of a CLI file, which specifies parameters relating to movement of the tool, such as the tool path (e.g., specified by position coordinate vectors and layer number), tool velocity, etc. The timing of the position of the tool can be computed based on these movement parameters. The data in the CLI file also controls when the tool is on, i.e., scanning or working, versus when it is merely moving from one position to another. A vector which specifies movement while the tool is on may be referred to as a "working vector". The CLI file is segmented, i.e., divided, to separate the working vectors from the non-working vectors on each layer 540. This allows determination of the "working tool position" versus time for each layer, as both the position of the tool (while the tool is on) and the timing of its movement are known 550. The sensor data values versus time and the working tool positions versus time can be time correlated to produce sensor data values versus working tool position 560 for each machine. The sensor data of each machine may be compressed and transmitted via a network 570 from the corresponding edge gateway 240 of each machine to one or more data host/servers 270 (see FIG. 2).

In disclosed embodiments, the time correlation is performed by aligning waveforms of the sensor data values versus time with the working tool positions versus time. Specifically, as the laser switches from an off condition in a non-working vector to an on condition in a subsequent working vector, and vice versa, these binary conditions produce a square wave characteristic. The activation of the laser in the working vectors results in a significant increase in the sensor data values from the pyrometer, followed by a sharp drop in the sensor data values when the laser is switched off in a subsequent non-working vector. Thus, the waveform of the sensor data values is substantially a square wave, except that there is a delay relative to the working vector, and some rounding of the waveform, due to a natural lag between laser activation/deactivation and the pyrometer readings. Nevertheless, the waveforms of the sensor data values can be aligned with corresponding working vectors to effectively achieve a time correlation therebetween. Alternatively, in disclosed embodiments, the time correlation may be performed by stepping through the time data points of the working tool positions versus time data, searching for a close time data point in the sensor data values versus time, and matching the corresponding sensor data value with the corresponding working tool position. Various other algorithms for correlating the data points with respect to time may be used.

As shown in FIG. 5B, sensor data is received via the network 572 from each machine of the fleet by one or more data host/servers 270 (see FIG. 2). The data host/server 270, in turn, makes the sensor data available to a user interface device 275, of which there may be many connected to each data host/server 270. The sensor data of each machine may be decompressed 572 by the data host/server 270 or by the user interface device 275, the latter approach having the advantage that the data may be sent from the data host/server 270 to a number of user interface devices 275 in compressed form (see FIG. 2). In the event the user interface device performs the decompression, the sensor data may be retrieved from the data host/server 270 by the user interface device 275 using, for example, a web service. The sensor data may be retrieved by the user interface device 275 on a layer-by-layer basis.

Process data from the corresponding manufacturing machine of the fleet, e.g., from a CLI file, is used to correlate the measured sensor data values of each layer with the geometry of a corresponding layer of the part 574. For example, the working tool vectors can be computed from the CLI file of each machine and, in turn, the sensor data versus working tool position can be determined for each machine, as discussed above (see FIG. 5A, 560). The working tool positions thus provide a baseline geometry for each layer.

The correlated sensor data of each machine is compared to a determined set of reference sensor data for the part being manufactured 576. The reference sensor data is correlated to the same geometry, on a layer-by-layer basis, as the measured sensor data. Various methods of comparison are possible, such as, for example, performing a two-dimensional convolution, i.e., a cross-correlation, between the reference and measured sensor data. Such an operation would provide a way of quantifying the difference between reference and measured sensor data.

Alternatively, a differential may be computed between the reference and measured data to produce a two-dimensional set of differential values. Such values may be displayed by the user interface device 275 with color coding to indicate the magnitude of the differential. For example, areas of substantial difference between the measured and reference sensor values may be indicated in red to bring attention to these specific areas.

The comparison of the measured sensor data to the reference data allows for analysis of the heat distribution, i.e., heat profile, generated by the laser along the laser path. Process data, e.g., a build file, may comprise desired laser intensity settings in correspondence with laser path vectors. As the layers of the part are formed, some laser path vectors may be repeated numerous times to form vertical structures of the part. A particular laser intensity setting in the build file for the repeated laser path vector may result in a varying heat profile due to the constantly changing structure of the part beneath the laser path. The heat profile along portions of the laser path in which the laser forms complex structures, such as corners, overhangs, etc., is also of particular interest as this information facilitates the identification of problems in the formation of such structures.

In addition to measured sensor data, the data host/server also receives image data for each machine via the network 578. The image data is produced by equipment at each machine and may be in the form of video and/or still images. In the case of a still image, a long exposure time is used to obtain an image which includes the entirety of the laser path on a particular layer. The laser path will appear in such an image as high intensity lines on a dark background. The bright lines can be converted into vectors for each layer to provide a correlation with the layer of the part being fabricated at the time of the image 580. As discussed above with respect to the measured sensor data, the image data can be compared to a set of reference image data 582. Such a comparison can be done using an appropriate mathematical algorithm, such as a two-dimensional convolution. The comparison of measured and reference image data allows for detection and analysis of deviations in the laser path.

In disclosed embodiments, a part may be selected to be a reference part based on measurements and analysis may be performed on the part, e.g., visual/physical evaluation, x-ray analysis, and microscopic analysis. Once the reference part has been selected, measured data from the manufacture of the reference part, e.g., pyrometer sensor data and image data, may be used to create a digital profile of a "good part," i.e., a part which meets determined levels of quality. Measured data from subsequently manufactured parts, e.g., pyrometer sensor data and image data, may be compared to the measured data from the reference part. In a fleet of manufacturing machines, a reference part from one machine may be used as the reference part for all of the machines in the fleet. As an alternative to a designated reference part, measured data from manufactured parts may be compared to reference values calculated from process data for the machine, e.g., the laser path vectors and laser power settings of the build file of the machine. For example, comparison measures may be determined based on the measured deviation from laser path vectors. Specifically, as parts are manufactured, image data may be used to produce actual laser path vectors, which may be compared to the laser path vectors from the build file.

A set of comparison measures is generated for each machine 590 based on the comparison of the sensor data to reference sensor data (576) and the comparison of the image data to the reference image data (582). For example, a two-dimensional convolution may be performed between the measured sensor data and the reference sensor data for each layer of the part. This would produce a comparison value for each layer of the part, which could be used as a set of comparison measures. The resulting array of layer-by-layer comparison measures could be reduced to a single comparison value for the part, e.g., by determining the average or maximum value of the array. Other types of mathematical operations could be used to produce a single comparison value, or set of comparison values. In disclosed embodiments, an average or maximum laser path deviation can be determined from the measured image data and used as a comparison measure. As a further example, a convolution of the image data with the reference image data may be performed to produce a value, or set of values, which can be used as comparison measures. In disclosed embodiments, the user interface device 275 may render the image data overlaid on the layer geometry and pyrometer sensor data to provide a concise model of the fabrication of the particular layer.

The comparison measures of each of the machines of a fleet is evaluated relative to the fleet as a whole to determine a best-performing machine 592, i.e., the machine which produces parts of the best quality. The process parameters of the best-performing machine (which may be considered to constitute a model of the machine) are distributed via a network to the rest of the machines of the fleet to improve the performance of the entire fleet 594. The process parameters of a machine may, for example, include: the process data which controls the operation of the working tool (e.g., a CLI file); environmental parameters (e.g., temperature, humidity, etc.); and other inputs and settings of the machine. In addition, because the difference in performance is being examined on a machine-to-machine basis, the process parameters may also include the machine maker, model, location, service information, etc. Some process parameters, such as process data in the form of a CLI file, may be distributed to machines in the fleet and used by the machines to control the path and intensity of the working tool. In such a case, a CLI file of one or more machines may be adjusted, based on image data, to correct the path of the laser to provide greater structural accuracy in the manufactured part. The CLI file of the machine which performs best can then be distributed to the other machines. Other process parameters, such as environmental parameters and machine maker and model, provide guidance for controlling the environment of the machine (e.g., by controlling environmental systems of a manufacturing plant) or substituting one type of machine for another. The deployment of the best set of process parameters, or model, to the other machines in the fleet may be done repeatedly in an iterative manner until defined performance goals are met.

In disclosed embodiments, manufacturing machines may be trained and evaluated based on line workload balance. A determination can be made as to when a job involving multiple machines of the fleet can be completed, both under normal operational conditions and when one or more machines in the line are having problems. This, in turn, allows for a determination to be made as to whether it is better to proceed with production or to shut down one or more machines to perform repairs. In such a case, the performance of the fleet of machines may be judged in terms of production-related parameters, such as throughput.

In disclosed embodiments, the performance of parts in the field over time may be compared to part data from the manufacturing process. Some parts may be performing better than others in the field, so machine learning could be used to relate these differences back to the manufacturing data. This may include comparing the performance of parts manufactured in different facilities and with different machine make/models. The resulting data may indicate, for example, that a machine from a particular vendor is better at manufacturing one type of part better than machines from other vendors.

In disclosed embodiments, probabilistic models may be applied to the reference data, or calculated reference values, to define a tolerance range for deviations. Measured data from manufactured parts may be compared to the probabilistic tolerance range to determine whether the output of a machine differs from the reference to a degree that is statistically significant. For example, a probabilistic function such as, for example, white noise, colored noise, constant offset, etc., may be applied to the reference pyrometer sensor data set. The measured pyrometer sensor data may be compared to the reference pyrometer sensor data set, as well as one or more data sets formed by applying a probabilistic function to the reference pyrometer data set. If a white noise probabilistic model is used and the comparison with the measured pyrometer sensor data set yields a sufficiently close cross-correlation, then it may be deemed, within a probabilistic confidence, that the measured data set is the same as the reference data set. In such a case, the performance of a machine may be deemed to be within a normal range. If the determined difference is statistically significant, then the machine may be identified as operating outside of specifications.

The reference data sets and probabilistic models can be used in a digital twin, i.e., analytical model, of the manufacturing process. The digital twin may be refined over time as more measured data becomes available. The refined digital twin may be used to predict the resulting measured data sets for a particular part design. This allows corrective measures to be applied to the part design based on the structures which make up the design. For example, an overhang of particular shape and size may be predicted by the digital twin to have unacceptable pyrometry characteristics and, in turn, unacceptable part quality.

In disclosed embodiments, every machine in the fleet can be considered to be a machine learning problem for purposes of developing models (e.g., digital twins) of the machines and associated manufacturing processes. As explained above, the model corresponding to the best performing machine can be selected and used in all the machines of the fleet. This selection and distribution can be repeated in an iterative manner to improve the performance level of the entire fleet. In disclosed embodiments, a multi-dimensional space of machine configuration parameters (e.g., the process parameters) may be created so that the manufacturing process can be improved. Over time the parameter space may be searched algorithmically (i.e., the parameters are periodically adjusted) to find better results, thereby converging the parameter space to values that produce parts within tolerance.

In disclosed embodiments, the determination of sensor data values versus working tool position provides a space domain context in which to consider the sensor data values, i.e., the points in 3D space at which each sensor measurement was made. The sensor data values in their space domain context form a "point cloud" of sensor data values at specific points in space which, in turn, can be correlated to the physical structure of the manufactured part, e.g., by using a 3D model of the part. For example, measured laser intensities can be correlated with the point in 3D space at which they are measured, and this point can be mapped to a corresponding point or element on the surface of the manufactured part. In disclosed embodiments, the mapping is done on a layer-by-layer basis.

In disclosed embodiments, geometrically-correlated contextual part information collected during manufacture, e.g., sensor data, may be used to generate a data display. For example, a rendering engine may be used to display the data in a three-dimensional perspective view. The rendering engine may also color code the data so that the sensor data can be more easily visualized. For example, higher levels of laser intensity may be presented in red. The color coding may be applied by the rendering engine to elements of a structural model, e.g., a 3D CAD model, of the manufactured part. The 3D model of the part may be stored, e.g., in a 3D CAD stereolithography (STL) file. With such tools, data points which have values close to nominal, i.e., reference, values can be distinguished from data points which have questionable values or values far from the reference values. This information, in turn, can be used to compare the performance of manufacturing machines in a fleet and to track performance trends over time. For example, the data may indicate that dimensional tolerances for a specific type of structure, e.g., overhangs, is deteriorating for particular machine, or set of machines, in the fleet. Such an indication would allow for an investigation to be performed on the affected machines to ascertain the cause of the deterioration. For example, the affected machines may be part of a specific lot, may be subject to environmental conditions that are unique to the affected machines, and/or may be using a different set of process data (i.e., instructions) than other machines.

A 3D CAD model of the part may be used in the mapping of the measurement points of the sensor data values onto the physical structure of the part because process data files, e.g., CLI files, typically do not include information regarding the physical structure of the part. For example, an STL file may be used as the source of the 3D model of the part. The sensor data values in the point cloud can each be correlated, on a layer-by-layer basis, with the closest corresponding point/element of the 3D model (an STL file defines the physical structure as a shell rather than as a point cloud, so the correlation is not per se point-to-point). The corresponding elements of the 3D model can then be modified to indicate the corresponding sensor data value, e.g., by setting the element of the 3D model to a specific color based on a determined color code. The 3D model with a representation of the sensor data (e.g., represented by a color code) can be rendered, according to layer, on a display of the user interface device using conventional rendering techniques. Alternatively, the point cloud of sensor data values could be color coded and separately rendered superimposed on the 3D model on a layer-by-layer basis. In such a case, the point cloud of sensor data values for a particular layer may be aligned as a whole with the corresponding layer of the 3D model, rather than on a point-to-point basis, e.g., by alignment of designated reference points. The rendering and display of the 3D model and sensor data value point cloud is done on a layer-by-layer basis. In disclosed embodiments, the 3D model may be displayed as individual 2D models of each layer, e.g., by presenting a plan view of each layer.

Figure 6:
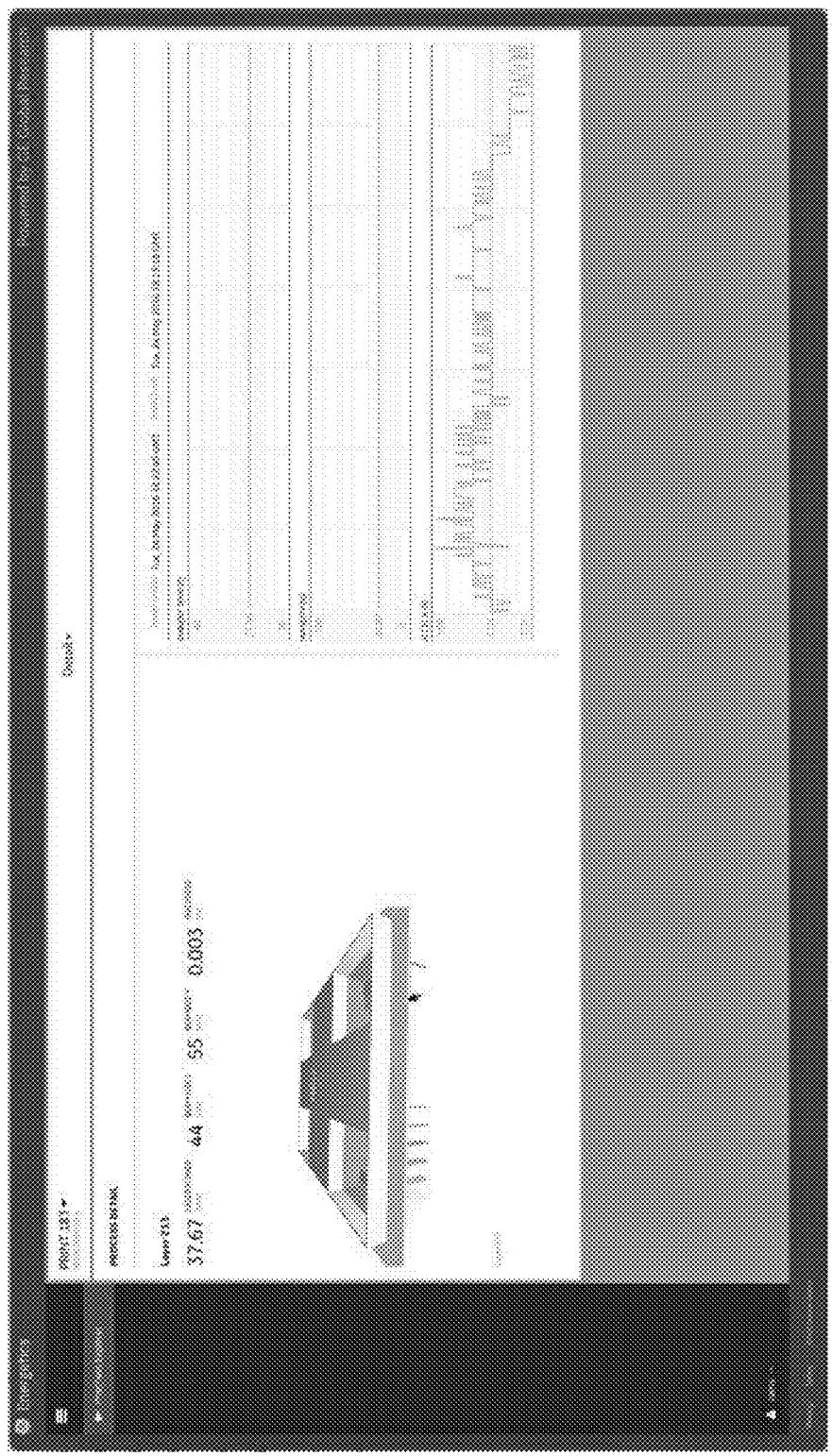
FIG. 6 depicts an example of a user interface screen displaying sensor data for a layer of a part manufactured by a selected machine.

FIG. 6 depicts an example of a user interface screen displaying sensor data for a part manufactured by a selected additive manufacturing machine. A particular machine can be selected by a user, e.g., by making a selection on a menu screen provided by the user interface web app. In disclosed embodiments, the user also selects a specific layer to view (which may be identified by number). The user interface displays an information screen which includes an image of the selected layer of the part, such as, for example, a perspective view of the top and the front edge of the selected layer. The user interface also may display a laser power level, laser beamsize specified for the layer in the process data file, as well as the layer thickness. In addition, the user interface may display, in graphical form, parameters which are subject to change over the course of scanning a layer, such as, for example, ambient temperature, humidity, and laser acceleration.

Figure 7:
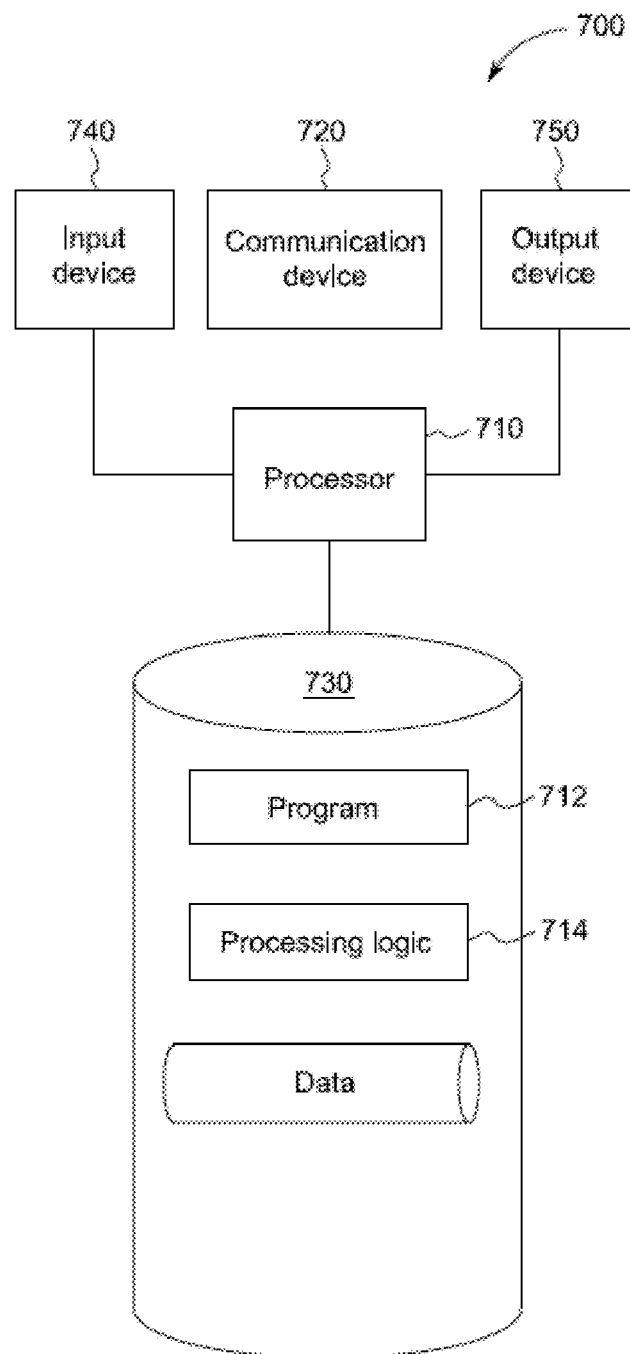
FIG. 7 depicts a processing platform for implementing embodiments described herein.

The embodiments described herein may be implemented using any number of different hardware configurations. For example, FIG. 7 illustrates a processing platform 700 that may be, for example, associated with components of the systems disclosed herein. The processing platform 700 comprises a processor 710, such as one or more commercially available central processing units (CPUs) in the form of one-chip microprocessors, coupled to a communication device 720 configured to communicate via a communication network (not shown). The communication device 720 may be used to communicate, for example, with one or more users. The processing platform 700 further includes an input device 740 (e.g., a mouse and/or keyboard to enter information) and an output device 750.

The processor 710 also communicates with a memory/storage device 730. The storage device 730 may comprise any appropriate information storage device, including combinations of magnetic storage devices (e.g., a hard disk drive), optical storage devices, mobile telephones, and/or semiconductor memory devices. The storage device 730 may store a program 712 and/or processing logic 714 for controlling the processor 710. The processor 710 performs instructions of the programs 712, 714, and thereby operates in accordance with any of the embodiments described herein. For example, the processor 710 may receive data and then may apply the instructions of the programs 712, 714 to carry out methods disclosed herein.

The programs 712, 714 may be stored in a compressed, uncompiled and/or encrypted format. The programs 712, 714 may furthermore include other program elements, such as an operating system, a database management system, and/or device drivers used by the processor 710 to interface with peripheral devices. Information may be received by or transmitted to, for example: (i) the platform 700 from another device; or (ii) a software application or module within the platform 700 from another software application, module, or any other source.

It is noted that aggregating data collected from or about multiple industrial assets (e.g., additive manufacturing machines) may enable users to improve operational performance. In an example, an industrial asset may be outfitted with one or more sensors configured to monitor respective ones of an asset's operations or conditions. Such sensors may also monitor the condition of a component part being processed, e.g., manufacturer, by the asset. Data from the one or more sensors may be recorded or transmitted to a cloud-based or other remote computing environment. By bringing such data into a cloud-based computing environment, new software applications informed by industrial process, tools and know-how may be constructed, and new physics-based analytics specific to an industrial environment may be created. Insights gained through analysis of such data may lead to enhanced asset designs, or to enhanced software algorithms for operating the same or similar asset at its edge, that is, at the extremes of its expected or available operating conditions. The data analysis also helps to develop better service and repair protocols and to improve manufacturing processes.

The systems and methods for managing industrial assets may include or may be a portion of an Industrial Internet of Things (IIoT). In an example, an IIoT connects industrial assets, such as turbines, jet engines, and locomotives, to the Internet or cloud, or to each other in some meaningful way. The systems and methods described herein may include using a "cloud" or remote or distributed computing resource or service. The cloud may be used to receive, relay, transmit, store, analyze, or otherwise process information for or about one or more industrial assets. In an example, a cloud computing system may include at least one processor circuit, at least one database, and a plurality of users or assets that may be in data communication with the cloud computing system. The cloud computing system may further include, or may be coupled with, one or more other processor circuits or modules configured to perform a specific task, such as to perform tasks related to asset maintenance, analytics, data storage, security, or some other function. Such cloud-based systems may be used in conjunction with the message queue-based systems described herein to provide widespread data communication with industrial assets, both new and old.

The flowcharts and/or block diagrams in the figures illustrate the architecture, functionality, and operation of possible implementations of systems, methods and computer program products according to various embodiments of the present invention. In this regard, each block in the flowcharts and/or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowcharts, and combinations of blocks in the block diagrams and/or flowcharts, can be implemented by special purpose hardware-based systems that perform the specified functions or acts, or combinations of special purpose hardware and computer instructions.

Those in the art will appreciate that various adaptations and modifications of the above-described embodiments can be configured without departing from the scope and spirit of the claims. Therefore, it is to be understood that the claims may be practiced other than as specifically described herein.

The invention claimed is:

1. A method comprising:
   receiving, at a host server, sensor data captured of a plurality of machines within a fleet performing a manufacturing process;
   receiving, at the host server, tool position data of the plurality of machines performing the manufacturing process;
   correlating sensor data values and tool positions of a part being manufactured to render correlated sensor data, the sensor data values and the tool positions being correlated based on respective timing information included in the received sensor data and the received tool position data;
   generating, for each of the plurality of machines performing the manufacturing process, a set of comparison measures by comparing the correlated sensor data to reference data values for a plurality of layers of the part;
   determining an optimum-performing machine from among the plurality of machines based on the set of comparison measures generated for each of the plurality of machines, wherein the optimum-performing machine is determined as a machine from among the plurality of machines having a generated set of comparison measures that is closest to a defined goal for the sets of comparison measures;
   distributing manufacturing process parameters of the optimum-performing machine to at least one other machine from among the plurality of machines of the fleet; and
   manufacturing, by the at least one other machine of the fleet, a second part using the manufacturing process parameters of the optimum-performing machine.

2. The method of claim 1, wherein the correlating comprises determining tool positions relative to time based on process data which controls operation of the plurality of machines, the process data comprising vectors defining the tool positions at each of the plurality of layers of the part being manufactured.

3. The method of claim 1, wherein the correlating, the determining, and the distributing of the process parameters are iteratively repeated to reach a defined manufacturing performance goal for the plurality of machines.

4. The method of claim 1, wherein the determining further comprises applying a probabilistic function to the reference data values at the tool positions of the plurality of layers of the part being manufactured.

5. The method of claim 1, further comprising:
   receiving image data produced at the plurality of machines during the manufacturing process and correlating the image data to the tool positions of the plurality of layers of the part being manufactured;
   wherein the determining of the optimum-performing machine is further performed based on the correlated image data.

6. The method of claim 5, wherein the determining is performed based on deviation values between an actual laser path indicated by the image data and a target laser path defined by reference image data.

7. The method of claim 6, wherein the reference image data is determined by analysis of a reference part.

8. The method of claim 6, wherein the reference image data is determined based on vectors of process data defining the tool positions of each of the plurality of layers of the part to be manufactured.

9. The method of claim 1, wherein the process parameters include at least one of: process data defining the tool positions during manufacturing of the part, measurements of the operating environment of the optimum-performing machine, and operational settings of the optimum-performing machine.

10. A system comprising:
    a storage configured to store reference data values for a part to be manufactured; and
    a processor configured to perform:
       receiving sensor data captured of a plurality of machines within a fleet performing a manufacturing process;
       receiving tool position data of the plurality of machines performing the manufacturing process;
       correlating sensor data values and tool positions of a part being manufactured to render correlated sensor data, the sensor data values and the tool positions being correlated based on respective timing information included in the received sensor data and the received tool position data;
       generating, for each of the plurality of machines performing the manufacturing process, a set of comparison measures by comparing the correlated sensor data to reference data values for a plurality of layers of the part;
       determining an optimum-performing machine from among the plurality of machines based on the set of comparison measures generated for each of the plurality of machines, wherein the optimum-performing machine is determined as a machine from among the plurality of machines having a generated set of comparison measures that is closest to a defined goal for the sets of comparison measures;
       distributing manufacturing process parameters of the optimum-performing machine to at least one other machine from among the plurality of machines of the fleet; and cause, by the at least one other machine of the fleet, a second part to be manufactured using the process parameters of the optimum-performing machine.

11. The system of claim 10, wherein the processor is further configured to perform determining tool positions relative to time based on process data which controls operation of the plurality of machines, the process data comprising vectors defining the tool positions at each of the plurality of layers of the part being manufactured.

12. The system of claim 10, wherein the correlating, the determining, and the distributing of the process parameters are iteratively repeated to reach a defined manufacturing performance goal for the plurality of machines.

13. The system of claim 10, wherein the determining further comprises applying a probabilistic function to the reference data values at the tool positions of the plurality of layers of the part being manufactured.

14. The system of claim 10, wherein the processor is further configured to perform:
receiving image data produced at the plurality of machines during the manufacturing process and correlating the image data to the tool positions of the plurality of layers of the part being manufactured; and
wherein the determining of the optimum-performing machine is further performed based on the correlated image data.

15. The system of claim 14, wherein the determining is performed based on deviation values between an actual laser path indicated by the image data and a target laser path defined by reference image data.

16. The system of claim 15, wherein the reference image data is determined by analysis of a reference part.

17. The system of claim 15, wherein the reference image data is determined based on vectors of process data defining the tool positions of each of the plurality of layers of the part to be manufactured.

18. The system of claim 10, wherein the process parameters include at least one of: process data defining the tool positions during manufacturing of the part, measurements of the operating environment of the optimum-performing machine, and operational settings of the optimum-performing machine.

19. A method comprising:
receiving manufacturing data of a plurality of machines performing a manufacturing process, the manufacturing data for each machine comprising sensor information measuring an attribute of the manufacturing process performed by a respective machine, and tool position information of the respective machine during the manufacturing process;
correlating the sensor information and the tool position information of a part being manufactured to render correlated sensor data,
generating, for each of the plurality of machines performing the manufacturing process, a set of comparison measures by comparing the correlated sensor data to reference data values for a plurality of layers of the part;
determining an optimum-performing machine from among the plurality of machines based on the received manufacturing data with respect to reference data values, wherein the optimum-performing machine is determined as a machine from among the plurality of machines having a generated set of comparison measures that is closest to a defined goal for the sets of comparison measures;
modifying manufacturing parameters of at least one other machine among the plurality of machines based on process parameters of the optimum-performing machine; and
manufacturing, by the at least one other machine of the fleet, a second part using the process parameters of the optimum-performing machine.

* * * * *